United States Patent
Zhang (10) Patent No.: US 12,328,735 B2
(45) Date of Patent: Jun. 10, 2025

(54) PARAMETER DETERMINING METHOD AND RELATED APPARATUS

(71) Applicant: GUANGDONG OPPO MOBILE TELECOMMUNICATIONS CORP., LTD., Dongguan (CN)

(72) Inventor: Zhi Zhang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 416 days.

(21) Appl. No.: 17/704,602

(22) Filed: Mar. 25, 2022

(65) Prior Publication Data
US 2022/0217691 A1    Jul. 7, 2022

Related U.S. Application Data

(63) Continuation of application No. PCT/CN2019/116857, filed on Nov. 8, 2019.

(51) Int. Cl.
H04W 72/23    (2023.01)

(52) U.S. Cl.
CPC ................... H04W 72/23 (2023.01)

(58) Field of Classification Search
None
See application file for complete search history.

(56) References Cited

U.S. PATENT DOCUMENTS

| | | |
|---|---|---|
| 2013/0044706 A1 | 2/2013 | Suzuki et al. |
| 2016/0249337 A1 | 8/2016 | Liang et al. |
| 2019/0053209 A1 | 2/2019 | Huss et al. |
| 2019/0150120 A1 | 5/2019 | Sarkis et al. |
| 2020/0204313 A1* | 6/2020 | Choi .............. H04L 5/0048 |
| 2021/0345366 A1* | 11/2021 | Ying ............ H04W 72/0453 |
| 2022/0191839 A1* | 6/2022 | Ying ................ H04W 72/23 |

FOREIGN PATENT DOCUMENTS

| | | |
|---|---|---|
| CN | 106454694 A | 2/2017 |
| CN | 108702281 A | 10/2018 |
| CN | 109963348 A | 7/2019 |
| CN | 110035525 A | 7/2019 |
| CN | 110167122 A | 8/2019 |
| EP | 3755045 A1 | 12/2020 |
| WO | 2019047757 A1 | 3/2019 |
| WO | 2019128576 A1 | 7/2019 |

(Continued)

OTHER PUBLICATIONS

International Search Report issued in corresponding International Application No. PCT/CN2019/116857, mailed Aug. 21, 2020, 27 pages.

(Continued)

*Primary Examiner* — Christine T Duong
(74) *Attorney, Agent, or Firm* — BAYES PLLC (57) ABSTRACT

A parameter determination method includes: determining, by a user equipment (UE), a first parameter of a first downlink control information (DCI) according to first information, wherein the first information comprises at least one of a cell-specific first physical uplink shared channel (PUSCH) configuration, a UE-specific second PUSCH configuration, and a parameter of the first DCI other than the first parameter.

18 Claims, 2 Drawing Sheets

(56) References Cited

FOREIGN PATENT DOCUMENTS

| WO | 2019160089 A1 | 8/2019 |
|---|---|---|
| WO | 2019191948 A1 | 10/2019 |

OTHER PUBLICATIONS

Written Opinion of the International Searching Authority issued in corresponding International Application No. PCT/CN2019/116857, mailed Aug. 21, 2020, 10 pages.

"Corrections to NR scheduling and UL transmission procedures", Agenda Item: 7.1.3.3, Source: CATT, 3GPP TSG RAN WG1 Meeting #95 Discussion_R1-1812605, Spokane, USA, Nov. 12-16, 2018, 5 pages.

Second Office Action issued in corresponding European application No. 19951506.5, mailed Nov. 16, 2023.

Third Office Action issued in corresponding Chinese application No. 202210459693.5, mailed Dec. 7, 2023.

Source: Nokia, Nokia Shanghai Bell; Title: On Default Configurations for L1 Parameters 3GPP TSG RAN WG1 Meeting #94-bis R1-1811023 Chengdu, P.R. China, Oct. 8-12, 2018.

Priority Review issued in corresponding Chinese application No. 202210459693.5, mailed May 15, 2023.

First Office Action issued in corresponding Chinese application No. 202210459693.5, mailed May 31, 2023.

First Office Action issued in corresponding European application No. 19951506.5, mailed Apr. 26, 2023.

Second Office Action issued in corresponding Chinese application No. 202210459693.5, mailed Aug. 18, 2023.

Extended European Search Report issued in European application No. 19951506.5, mailed Aug. 16, 2022.

Request for the Submission of an Opinion issued in corresponding Korean Application No. 10-2022-7015295, dated Feb. 17, 2025, 9 pages.

"Summary of 7.2.6.1 PDCCH enhancements", Agenda Item: 7.2.6.1, Source: Huawei, 3GPP TSG RAN WG1 Meeting #98bis, R1-1911272, Chongqing, China, Oct. 14-20, 2019, 59 pages.

\* cited by examiner

PARAMETER DETERMINING METHOD AND RELATED APPARATUS

CROSS-REFERENCE TO RELATED APPLICATION

This application is a continuation application of PCT Application No. PCT/CN2019/116857, filed Nov. 8, 2019, the contents of which are incorporated herein by reference in its entirety.

TECHNICAL FIELD

This application relates to the field of communication technology, and in particular, to a parameter determination method and related devices.

BACKGROUND

Generally, in order to meet the occupied bandwidth (OCB) requirements, the physical uplink share channel (PUSCH) can be configured with interlace or non-interlace, and the user equipment (UE) determines how to interpret the downlink control information (DCI) according to the PUSCH configuration. When the cell-specific PUSCH configuration is different from the UE-specific PUSCH configuration, how to interpret the DCI by UE is a technical problem that needs to be solved.

SUMMARY

Embodiments of the application provides a parameter determination method and related devices, enabling UE to determine the parameter of DCI when the cell-specific PUSCH configuration is different from the UE-specific PUSCH configuration, thereby interpreting the DCI.

According to a first aspect, embodiments of the application provide a parameter determination method, being applied to a UE and including:

determining a first parameter of a first downlink control information (DCI) according to first information, wherein the first information includes at least one of a cell-specific first physical uplink shared channel (PUSCH) configuration, a UE-specific second PUSCH configuration, and a parameter of the first DCI other than the first parameter.

According to a second aspect, embodiments of the application provide a parameter determination device, being applied to a UE and including:

a processing unit, configured to determine a first parameter of a first downlink control information (DCI) according to first information, wherein the first information includes at least one of a cell-specific first physical uplink shared channel (PUSCH) configuration, a UE-specific second PUSCH configuration, and a parameter of the first DCI other than the first parameter.

According to a third aspect, embodiments of the application provide a user equipment, including a memory, a processor, a communication interface, and one or more programs, wherein the one or more programs are stored in the memory and configured to be executed by the processor, and include instructions for performing steps in the method described in the first aspect of the embodiments of the application.

According to a fourth aspect, embodiments of the application provide a computer-readable storage medium that stores a computer program for electronic data exchange, wherein the computer program causes a computer to perform the method described in the first aspect of the embodiments of the application.

According to a fourth aspect, embodiments of the application provide a computer program product that includes a non-transitory computer-readable storage medium storing a computer program, wherein the computer program is operable to cause a computer to perform part or all of steps in the method described in the first aspect of the embodiments of the application. The computer program product may be a software installation package.

It can be seen that in the embodiments of the application, the UE determines the first parameter of the first DCI according to the first information, and the first information includes at least one of the first PUSCH configuration that is cell-specific, the second PUSCH configuration that is UE-specific, or the parameter of the first DCI other than the first parameter. The UE can determine the parameter of the first DCI, so as to interpret the first DCI.

These and other aspects of the application will be more concise and understandable in the description of the following embodiments.

BRIEF DESCRIPTION OF THE DRAWINGS

In order to more clearly describe the technical solutions in the embodiments of the application or related art, the following will briefly introduce the drawings that need to be used in the description of the embodiments or related art. Obviously, the drawings in the following description are only some embodiments of the application. For those of ordinary skill in the art, other drawings can be obtained based on these drawings without creative work.

DETAILED DESCRIPTION

The technical solutions in the embodiments of the application will be clearly and completely described below in conjunction with the accompanying drawings in the embodiments of the application. Obviously, the described embodiments are only a part of the embodiments of the application, rather than all the embodiments.

Based on the embodiments in this application, all other embodiments obtained by those of ordinary skill in the art without creative work shall fall within the protection scope of this application.

Detailed descriptions are given below.

The terms "first", "second", "third", "fourth" and the like in the specification and claims of the application and the drawings are only used for distinguishing different objects, rather than describing a specific order.

In addition, the terms "including", "having" and any variations thereof are intended to cover non-exclusive inclusions.

For example, a process, method, system, product, or device that includes a series of steps or units is not limited to the steps or units as listed, but optionally includes unlisted steps or units, or optionally further includes other steps or units inherent in the process, method, product or equipment.

Reference to "embodiment(s)" in the disclosure means that a specific feature, structure, or characteristic described in conjunction with the embodiment(s) may be included in at least one embodiment of the application. Such reference in various places in the specification does not necessarily refer to the same embodiment(s), nor is it an independent or alternative embodiment mutually exclusive with other embodiments. As can be explicitly or implicitly understood by those skilled in the art, the embodiments described herein can be combined with other embodiments.

Figure 1:
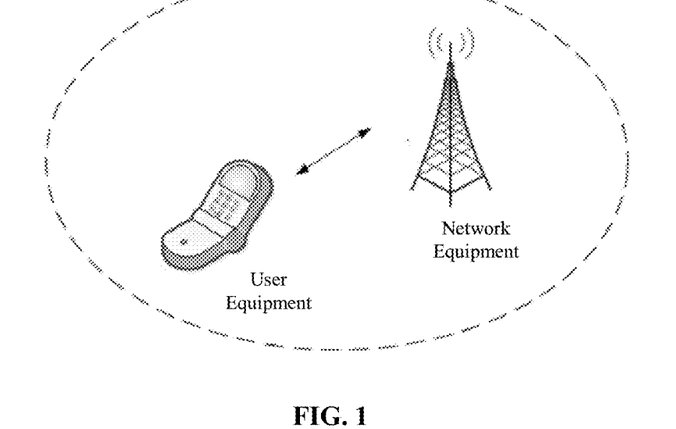
FIG. 1 is a schematic diagram of a communication system architecture according to some embodiments of the application.

Referring to FIG. 1. FIG. 1 is a schematic diagram of a communication system architecture according to some embodiments of the application. The communication system includes network equipment and user equipment. As shown in FIG. 1, the network equipment can communicate with the user equipment. The communication system may be a long-term evolution (LTE) system, a 5G communication system such as new radio (NR), a communication system that integrates multiple communication technologies (such as a communication system that integrates LTE technology and NR technology), or a subsequent evolution of the communication system. The form and quantity of network equipment and user equipment shown in FIG. 1 are only for example, and do not constitute a limitation to the embodiments of the application.

The user equipment in this application is a device with wireless communication function, which may be deployed on land, including indoor or outdoor, handheld, wearable or vehicle-mounted equipment. It may also be deployed on water (such as on ships), and may also be deployed in the air (such as airplane, balloon, satellite). The UE may be a mobile phone, a tablet computer (pad), a computer with wireless transceiver function, a virtual reality (VR) terminal device, an augmented reality (AR) terminal device, a wireless terminal in industrial control, a wireless terminal in self-driving, a wireless terminal in remote medical, a wireless terminal in smart grid, a wireless terminal in smart homes, and the like. The user equipment may also be a handheld device with a wireless communication function, a vehicle-mounted device, a wearable device, a computer device, or other processing device connected to a wireless modem. User equipment in different networks may be referred to as different names, for example, terminal equipment, access terminal, user unit, user station, mobile station, remote station, remote terminal, mobile equipment, user terminal, terminal, wireless communication equipment, user agent, user device, cell phone, cordless phone, session initiation protocol (SIP) phone, wireless local loop (WLL) station, personal digital assistant (PDA), terminal device in 5G network or in the future evolution network.

The network equipment in this application is a device deployed in a wireless access network to provide wireless communication functions.

For example, the network equipment may be a radio access network (RAN) device on the access network side of the cellular network. The RAN device is a device used for connecting the UE to the wireless network, including but not limited to: evolved Node B (eNB), radio network controller (RNC), Node B (NB), base station controller (BSC), base transceiver station (BTS), home base station (for example, home evolved Node B, or home Node B, HNB), base band unit (BBU), mobility management entity (MME). For another example, the network equipment may also be node devices in a wireless local area network (WLAN), such as an access controller (AC), gateway, or WIFI access point (AP). For another example, the network equipment may also be a transmission node or a transmission reception point (TRP or TP) in NR system, and the like.

Embodiments of the application provide a parameter determination method. The parameter determination method is applied to a user equipment (UE) and includes a following step:

determining a first parameter of a first downlink control information (DCI) according to first information, where the first information includes at least one of a cell-specific first physical uplink shared channel (PUSCH) configuration, a UE-specific second PUSCH configuration, and a parameter of the first DCI other than the first parameter.

Optionally, the DCI format of the first DCI includes DCI format 0_0 and/or DCI format 0_1.

Optionally, the first parameter includes at least one of the following: the number of bits of the first DCI, a type of the first DCI, a first information field in the first DCI, the number of bits of a second information field in the first DCI, or a bit position of the second information field in the first DCI.

The first information field and the second information field field be the same information field or different information fields.

Optionally, the UE acquires the first PUSCH configuration, and the determining the first parameter of the first DCI according to the first information includes: determining the first parameter according to the first PUSCH configuration in response to that the second PUSCH configuration is not acquired or that the second PUSCH configuration is acquired.

Specifically, the UE determines the first parameter according to the first PUSCH configuration. In other words, when the UE obtains the first PUSCH configuration, regardless of whether the UE obtains the second PUSCH configuration, the UE determines the first parameter of the first DCI according to the first PUSCH configuration.

In another example, the UE acquires the first PUSCH configuration, and the determining the first parameter of the first DCI according to the first information includes: determining the first parameter according to the first PUSCH configuration in response to that the second PUSCH configuration is not acquired; and determining the first parameter according to the second PUSCH configuration in response to that the second PUSCH configuration is acquired.

Specifically, the UE determines the first parameter according to the first PUSCH configuration and the second PUSCH configuration. In other words, if the UE obtains the first PUSCH configuration, when the UE does not obtain the second PUSCH configuration, the UE determines the first parameter according to the first PUSCH configuration; and when the UE obtains the second PUSCH configuration, the UE determines the first parameter according to the second PUSCH configuration.

Optionally, during resetting of the second PUSCH configuration, the determining the first parameter of the first DCI according to the first information includes: determining the first parameter according to the first PUSCH configuration.

Specifically, during the period for reconfiguring the second PUSCH, the UE determines the first parameter according to the first PUSCH configuration.

In yet another example, the UE acquires the first PUSCH configuration, and the determining the first parameter of the first DCI according to the first information includes: determining the first parameter according to the first PUSCH configuration in response to that the second PUSCH configuration is not acquired; and determining the first parameter according to second information in response to that the second PUSCH configuration is acquired and first configuration parameters are different between the first PUSCH configuration and the second PUSCH configuration, wherein the second information includes a type of search space in which the UE searches for DCI and/or a format of the first DCI.

Specifically, the UE determines the first parameter according to the first PUSCH configuration and the second PUSCH configuration. In other words, if the UE obtains the first PUSCH configuration, when the UE does not obtain the second PUSCH configuration, the UE determines the first parameter according to the first PUSCH configuration; and when the UE obtains the second PUSCH configuration, and the first configuration parameter in the first PUSCH configuration is different from that in the second PUSCH configuration, the UE determines the first parameter according to the second information. The second information includes the type of search space for the UE to search for DCI and/or the format of the first DCI. The UE determines the first parameter according to the search space type, or the UE determines the first parameter according to the format of the first DCI, or the UE determines the first parameter according to the search space type and the format of the first DCI.

Optionally, the search space types include common search space (CSS) and UE-specific search space (USS).

Optionally, the first configuration parameter includes a parameter for configuring PUSCH with interlace or non-interlace.

Specifically, the cases where the first configuration parameters in the first PUSCH configuration and the second PUSCH configuration are different include: interlace is configured for PUSCH in the first PUSCH configuration, and non-interlace (or contiguous) is configured for PUSCH in the second PUSCH configuration; or, the PUSCH is configured with non-interlace (or contiguous) in the first PUSCH configuration, and the PUSCH is configured with interlace in the second PUSCH configuration.

Optionally, the second information includes the search space type, and the determining the first parameter according to the second information includes: determining the first parameter according to the first PUSCH configuration in response to the search space type being CSS; and determining the first parameter according to the second PUSCH configuration in response to the search space type being USS.

Specifically, the UE determines the first parameter according to the search space type. In other words, when the UE searches for DCI in the CSS, the UE determines the first parameter according to the first PUSCH configuration; when the UE searches for the DCI in the USS, the UE determines the first parameter according to the second PUSCH configuration. In some embodiments, the UE searching for the DCI in the CSS includes: the UE detects the DCI format 0_0 and/or the DCI format 0_1 in the CSS. The UE searching for DCI in the USS includes: the UE detects the DCI format 0_0 and/or the DCI format 0_1 in the USS.

Optionally, the second information includes the format of the first DCI, and the determining the first parameter according to the second information includes: determining the first parameter according to the first PUSCH configuration in response to the format being DCI format 0_0; and determining the first parameter according to the second PUSCH configuration in response to the format being DCI format 0_1.

Specifically, the UE determines the first parameter according to the format of the first DCI.

Optionally, the second information includes the search space type and the format of the first DCI, and the determining the first parameter according to the second information includes: determining the first parameter according to the first PUSCH configuration in response to the search space type being CSS and the format being DCI format 0_0; and determining the first parameter according to the second PUSCH configuration in response to the search space type being CSS and the format being DCI format 0_1, or in response to the search space type being USS and the format being DCI format 0_0 or DCI format 0_1.

Specifically, the UE determines the first parameter according to the search space type and the format of the first DCI. In other words, when the UE detects the DCI format 0_0 in the CSS, the UE determines the first parameter according to the first PUSCH configuration; when the UE detects the DCI format 0_1 in the CSS, or when the UE detects the DCI format 0_0 in the USS, or when the UE detects the DCI format 0_1 in the USS, the UE determines the first parameter according to the second PUSCH configuration.

Optionally, the second information includes the search space type and the format of the first DCI, and the determining the first parameter according to the second information includes: determining the first parameter according to the first PUSCH configuration in response to the search space type being CSS and the format being DCI format 0_1; and determining the first parameter according to the second PUSCH configuration in response to the search space type being CSS and the format being DCI format 0_0, or in response to the search space type being USS and the format being DCI format 0_0 or DCI format 0_1.

Specifically, the UE determines the first parameter according to the search space type and the format of the first DCI. In other words, when the UE detects the DCI format 0_1 in the CSS, the UE determines the first parameter according to the first PUSCH configuration; when the UE detects the DCI format 0_0 in the CSS, or when the UE detects the DCI format 0_0 in the USS, or when the UE detects the DCI format 0_1 in the USS, the UE determines the first parameter according to the second PUSCH configuration.

Optionally, the second information includes the search space type and the format of the first DCI, and the determining the first parameter according to the second information includes: determining the first parameter according to the second PUSCH configuration in response to the search space type being USS and the format being DCI format 0_0; and determining the first parameter according to the first PUSCH configuration in response to the search space type being USS and the format being DCI format 0_1, or in response to the search space type being CSS and the format being DCI format 0_0 or DCI format 0_1.

Specifically, the UE determines the first parameter according to the search space type and the format of the first DCI. In other words, when the UE detects DCI format 0_0 in the USS, the UE determines the first parameter according to the second PUSCH configuration; when the UE detects DCI format 0_1 in the USS, or when the UE detects DCI format 0_0 in the CSS, or when the UE detects the DCI format 0_1 in the CSS, the UE determines the first parameter according to the first PUSCH configuration.

Optionally, the second information includes the search space type and the format of the first DCI, and the determining the first parameter according to the second information includes: determining the first parameter according to the second PUSCH configuration in response to the search space type being USS and the format being DCI format 0_1; and determining the first parameter according to the first PUSCH configuration in response to the search space type being USS and the format being DCI format 0_0, or in response to the search space type being CSS and the format being DCI format 0_0 or DCI format 0_1.

Specifically, the UE determines the first parameter according to the search space type and the format of the first DCI. In other words, when the UE detects DCI format 0_1 in the USS, the UE determines the first parameter according to the second PUSCH configuration; when the UE detects DCI format 0_0 in the USS, or when the UE detects DCI format 0_0 in the CSS, or when the UE detects the DCI format 0_1 in the CSS, the UE determines the first parameter according to the first PUSCH configuration.

Optionally, parameters (for example, determined parameters) of the first DCI other than the first parameter include a second parameter of the first DCI and a third information field in the first DCI. The value of the second parameter in the first PUSCH configuration is the same as the value of the second parameter in the second PUSCH configuration, and the third information field is used for indicating whether to determine the first parameter according to the first PUSCH configuration or according to the second PUSCH configuration.

Specifically, the UE determines the first parameter according to other parameters of the first DCI. The other parameters of the first DCI include the second parameter of the first DCI and the third information field in the first DCI. The second parameter of the first DCI may be, for example, the number of bits in the first DCI, and the number of bits of the third information field may be 1. The UE detects the first DCI according to the second parameter, and the UE determines the first parameter according to the first PUSCH configuration or determines the first parameter according to the second PUSCH configuration according to the third information field.

It can be seen that in the embodiments of the application, the UE determines the first parameter of the first DCI according to the first information, and the first information includes at least one of the first PUSCH configuration that is cell-specific, the second PUSCH configuration that is UE-specific, and the parameter(s) of the first DCI other than the first parameter. The UE can determine the parameter of the first DCI, so as to interpret the first DCI.

Figure 2:
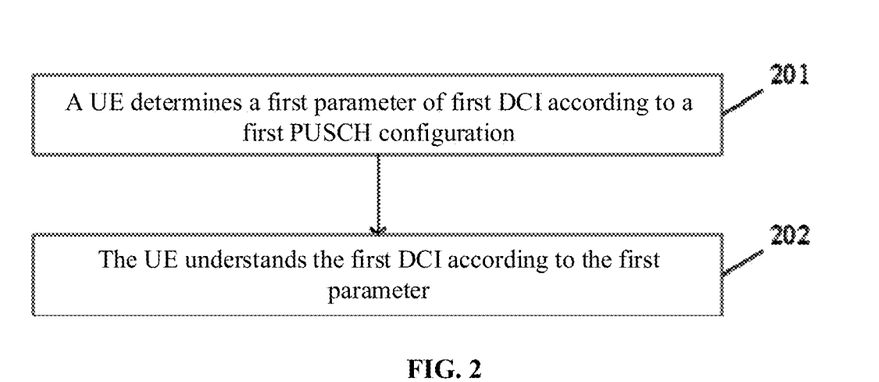
FIG. 2 is a schematic flowchart of a parameter determination method according to some embodiments of the application.

Referring to FIG. 2, FIG. 2 is a schematic flowchart of a parameter determination method according to some embodiments of the application, which is applied to user equipment and includes the following steps.

In step 201, the UE determines the first parameter of the first DCI according to the first PUSCH configuration.

In some embodiments, the format of the first DCI includes DCI format 0_0 and/or DCI format 0_1, and the first parameter includes at least one of: the number of bits of the first DCI, the type of the first DCI, the first information field in the first DCI, the number of bits of the second information field in the first DCI, or the bit position of the second information field in the first DCI.

Specifically, when the UE obtains the first PUSCH configuration, no matter whether the UE obtains the second PUSCH configuration or not, the UE determines the first parameter of the first DCI according to the first PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then the UE determines the number of bits corresponding to the DCI format 0_0 and the number of bits corresponding to the DCI format 0_1 according to the first PUSCH configuration, or determines the number of bits corresponding to one of information fields in the DCI format 0_0 and the DCI format 0_1, or determines the bit position and the number of bits corresponding to one of information fields in the DCI format 0_0 and the DCI format 0_1.

In some embodiments, the one of information fields may be, for example, the frequency domain resource allocation information field.

In step 202, the UE interprets the first DCI according to the first parameter.

For example, if the UE determines the number of bits corresponding to the frequency domain resource allocation information field in DCI format 0_0 and DCI format 0_1, the UE can interpret information in the frequency domain resource allocation information field in DCI format 0_0 and DCI format 0_1, thereby obtaining frequency domain resource allocation for data transmission.

For another example, if the UE determines the bit position and number of bits corresponding to the frequency domain resource allocation information field in DCI format 0_0 and DCI format 0_1, the UE can interpret information in the frequency domain resource allocation information field in DCI format 0_0 and DCI format 0_1, thereby obtaining frequency domain resource allocation for data transmission.

Figure 3:
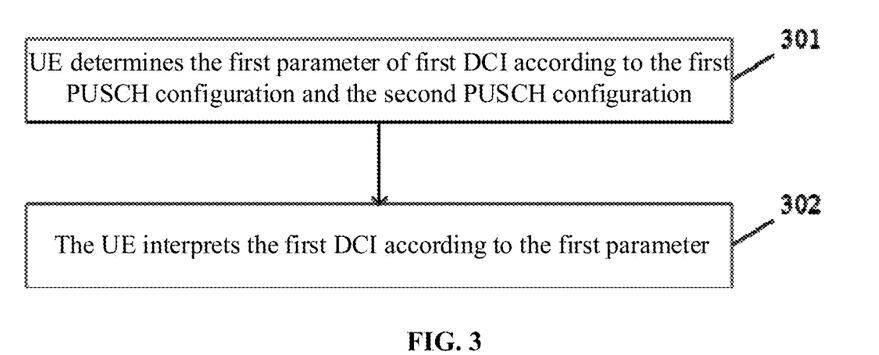
FIG. 3 is a schematic flowchart of a parameter determination method according to some other embodiments of the application.

Referring to FIG. 3, FIG. 3 is a schematic flowchart of the parameter determination method according to some other embodiments of the application, which is applied to user equipment and includes the following steps.

In step 301, the UE determines the first parameter of the first DCI according to the first PUSCH configuration and the second PUSCH configuration.

In some embodiments, the format of the first DCI includes DCI format 0_0 and DCI format 0_1, and the first parameter includes at least one of: the number of bits of the first DCI, the type of the first DCI, the first information field in the first DCI, the number of bits of the second information field in the first DCI and/or the bit position of the second information field in the DCI.

In some exemplary embodiments, the UE obtains the first PUSCH configuration, then if the UE does not obtain the second PUSCH configuration, the UE determines the first parameter according to the first PUSCH configuration; and if the UE obtains the second PUSCH configuration, the UE determines the first parameter according to the second PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then, when the UE does not obtain the second PUSCH configuration, the UE determines, according to the first PUSCH configuration, the number of bits corresponding to DCI format 0_0 and DCI format 0_1, or the bit position and/or the number of bits corresponding to one of information fields in DCI format 0_0 and DCI format 0_1.

In some embodiments, the one of information fields may be, for example, the frequency domain resource allocation information field. When the UE obtains the second PUSCH configuration, the UE determines, according to the second PUSCH configuration, the number of bits corresponding to DCI format 0_0 and DCI format 0_1, or the bit position and/or the number of bits corresponding to one of information fields in DCI format 0_0 and DCI format 0_1.

In some embodiments, the one of information fields may be, for example, the frequency domain resource allocation information field.

During the resetting of the second PUSCH configuration, the UE determines the first parameter according to the first PUSCH configuration. In other words, during the reconfiguration period of the second PUSCH, the UE determines the first parameter according to the first PUSCH configuration.

In some exemplary embodiments, the UE obtains the first PUSCH configuration, then if the UE does not obtain the second PUSCH configuration, the UE determines the first parameter according to the first PUSCH configuration. If the UE obtains the second PUSCH configuration, and a first configuration parameter in the first PUSCH configuration is different from that in the second PUSCH configuration, the UE determines the first parameter according to the second information, and the second information includes the search space type for the UE to search for DCI and/or the format of the first DCI.

In some embodiments, the search space type includes CSS and USS. The first configuration parameter includes a parameter for configuring PUSCH with interlace or non-interlace. Specifically, the first configuration parameters in the first PUSCH configuration and the second PUSCH configuration are different may refer to such a case that PUSCH is configured with interlace in the first PUSCH configuration and configured with non-interlace (or contiguous) in the second PUSCH configuration, or that PUSCH is configured with non-interlace (or contiguous) in the first PUSCH configuration and configured with interlace in the second PUSCH configuration.

Optionally, the second information includes the search space type, and the UE determines the first parameter according to the search space type. In other words, when the search space type is CSS, the UE determines the first parameter according to the first PUSCH configuration; when the search space type is USS, the UE determines the first parameter according to the second PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then, when the UE detects DCI format 0_0 and/or DCI format 0_1 in CSS, the UE determines, according to the first PUSCH configuration, the number of bits corresponding to DCI format 0_0 and DCI format 0_1, or the bit position and/or the number of bits corresponding to one of information fields in DCI format 0_0 and DCI format 0_1.

In some embodiments, the one of information fields may be, for example, the frequency domain resource allocation information field. When the UE detects DCI format 0_0 and/or DCI format 0_1 in USS, the UE determines, according to the second PUSCH configuration, the number of bits corresponding to DCI format 0_0 and DCI format 0_1, or the bit position and/or the number of bits corresponding to one of information fields in DCI format 0_0 and DCI format 0_1.

In some embodiments, the one of information fields may be, for example, the frequency domain resource allocation information field.

Optionally, the second information includes the format of the first DCI, and the UE determines the first parameter according to the format of the first DCI. In other words, when the format is DCI format 0_0, the UE determines the first parameter according to the first PUSCH configuration; when the format is DCI format 0_1, the UE determines the first parameter according to the second PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then, when the UE detects DCI format 0_0, the UE determines, according to the first PUSCH configuration, the number of bits corresponding to DCI format 0_0, or the bit position and/or the number of bits corresponding to one of information fields in DCI format 0_0.

In some embodiments, the one of information fields may be, for example, the frequency domain resource allocation information field. When the UE detects DCI format 0_1, the UE determines, according to the second PUSCH configuration, the number of bits corresponding to DCI format 0_1, or the bit position in DCI and/or the number of bits corresponding to one of information fields in DCI format 0_1.

In some embodiments, the one of information fields may be, for example, the frequency domain resource allocation information field.

Optionally, the second information includes the search space type and the format of the first DCI, and the UE determines the first parameter according to the search space type and the format of the first DCI. In other words, when the search space type is CSS and the format is DCI format 0_0, the UE determines the first parameter according to the first PUSCH configuration. When the search space type is CSS and the format is DCI format 0_1, or when the search space type is USS and the format is DCI format 0_0 or DCI format 0_1, the UE determines the first parameter according to the second PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then, when the UE detects DCI format 0_0 in CSS, the UE determines, according to the first PUSCH configuration, the number of bits corresponding to DCI format 0_0 in CSS, or the bit position in DCI and/or the number of bits corresponding to one of information fields in DCI format 0_0 in CSS. When the UE detects DCI format 0_1 in CSS, the UE determines, according to the second PUSCH configuration, the number of bits corresponding to DCI format 0_1 in CSS, or the bit position in DCI and/or the number of bits corresponding to one of information fields in DCI format 0_1 in CSS. When the UE detects DCI format 0_0 in USS, the UE determines, according to the second PUSCH configuration, the number of bits corresponding to DCI format 0_0 in USS, or the bit position in DCI and/or the number of bits corresponding to one of information fields in DCI format 0_0 in USS. When the UE detects DCI format 0_1 in USS, the UE determines, according to the second PUSCH configuration, the number of bits corresponding to DCI format 0_1 in USS, or the bit position in DCI and/or the number of bits corresponding to one of information fields in DCI format 0_1 in USS.

Optionally, the second information includes the search space type and the format of the first DCI, and the UE determines the first parameter according to the search space type and the format of the first DCI. In other words, when the search space type is CSS and the format is DCI format 0_1, the UE determines the first parameter according to the first PUSCH configuration. When the search space type is CSS and the format is DCI format 0_0, or when the search space type is USS and the format is DCI format 0_0 or DCI format 0_1, the UE determines the first parameter according to the second PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then, when the UE detects DCI format 0_1 in CSS, the UE determines, according to the first PUSCH configuration, the number of bits corresponding to DCI format 0_1 in CSS, or the bit position in DCI and/or the number of bits corresponding to one of information fields in DCI format 0_1 in CSS. When the UE detects DCI format 0_0 in CSS, the UE determines, according to the second PUSCH configuration, the number of bits corresponding to DCI format 0_0 in CSS, or the bit position in DCI and/or the number of bits corresponding to one of information fields in DCI format 0_0 in CSS. When the UE detects DCI format 0_0 in USS, the UE determines, according to the second PUSCH configuration, the number of bits corresponding to DCI format 0_0 in USS, or the bit position in DCI and/or the number of bits corresponding to one of information fields in DCI format 0_0 in USS. When the UE detects DCI format 0_1 in USS, the UE determines, according to the second PUSCH configuration, the number of bits corresponding to DCI format 0_1 in USS, or the bit position in DCI and/or the number of bits corresponding to one of information fields in DCI format 0_1 in USS.

Optionally, the second information includes the search space type and the format of the first DCI, and the UE determines the first parameter according to the search space type and the format of the first DCI. In other words, when the search space type is USS and the format is DCI format 0_0, the UE determines the first parameter according to the second PUSCH configuration. When the search space type is USS and the format is DCI format 0_1, or when the search space type is CSS and the format is DCI format 0_0 or DCI format 0_1, the UE determines the first parameter according to the first PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then, when the UE detects DCI format 0_0 in USS, the UE determines, according to the second PUSCH configuration, the number of bits corresponding to DCI format 0_0 in USS, or the bit position in DCI and/or the number of bits corresponding to one of information fields in DCI format 0_0 in USS. When the UE detects DCI format 0_1 in USS, the UE determines, according to the first PUSCH configuration, the number of bits corresponding to DCI format 0_1 in USS, or the bit position in DCI and/or the number of bits corresponding to one of information fields in DCI format 0_1 in USS. When the UE detects DCI format 0_0 in CSS, the UE determines, according to the first PUSCH configuration, the number of bits corresponding to DCI format 0_0 in CSS, or the bit position in DCI and/or the number of bits corresponding to one of information fields in DCI format 0_0 in CSS. When the UE detects DCI format 0_1 in CSS, the UE determines, according to the first PUSCH configuration, the number of bits corresponding to DCI format 0_1 in CSS, or the bit position in DCI and/or the number of bits corresponding to one of information fields in DCI format 0_1 in CSS.

Optionally, the second information includes the search space type and the format of the first DCI, and the UE determines the first parameter according to the search space type and the format of the first DCI. In other words, when the search space type is USS and the format is DCI format 0_1, the UE determines the first parameter according to the second PUSCH configuration. When the search space type is USS and the format is DCI format 0_0, or when the search space type is CSS and the format is DCI format 0_0 or DCI format 0_1, the UE determines the first parameter according to the first PUSCH configuration.

For example, PUSCH is configured with interlace in the first PUSCH configuration, PUSCH is configured with non-interlace (or contiguous) in the second PUSCH configuration, the number of bits corresponding to the DCI format 0_0 in the first PUSCH configuration is different from the number of bits corresponding to the DCI format 0_0 in the second PUSCH configuration, and the number of bits corresponding to the DCI format 0_1 in the first PUSCH configuration is different from the number of bits corresponding to the DCI format 0_1 in the second PUSCH configuration. Then, when the UE detects DCI format 0_1 in USS, the UE determines, according to the second PUSCH configuration, the number of bits corresponding to DCI format 0_1 in USS, or the bit position in DCI and/or the number of bits corresponding to one of information fields in DCI format 0_1 in USS. When the UE detects DCI format 0_0 in USS, the UE determines, according to the first PUSCH configuration, the number of bits corresponding to DCI format 0_0 in USS, or the bit position in DCI and/or the number of bits corresponding to one of information fields in DCI format 0_0 in USS. When the UE detects DCI format 0_0 in CSS, the UE determines, according to the first PUSCH configuration, the number of bits corresponding to DCI format 0_0 in CSS, or the bit position in DCI and/or the number of bits corresponding to one of information fields in DCI format 0_0 in CSS. When the UE detects DCI format 0_1 in CSS, the UE determines, according to the first PUSCH configuration, the number of bits corresponding to DCI format 0_1 in CSS, or the bit position in DCI and/or the number of bits corresponding to one of information fields in DCI format 0_1 in CSS.

In step 302, the UE interprets the first DCI according to the first parameter.

For example, if the UE determines the bit position in DCI and/or the number of bits corresponding to the frequency domain resource allocation information field in DCI format 0_0 and DCI format 0_1, the UE can interpret the information in the frequency domain resource allocation information field in DCI format 0_0 and DCI format 0_1, thereby obtaining frequency domain resource allocation for data transmission.

Figure 4:
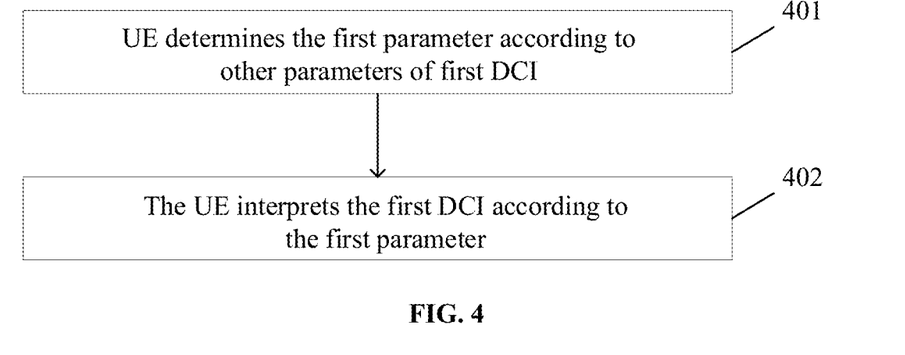
FIG. 4 is a schematic flowchart of a parameter determination method according to some other embodiments of the application.

Referring to FIG. 4, FIG. 4 is a schematic flowchart of the parameter determination method according to some other embodiments of the application, which is applied to UE and includes the following steps.

In step 401, the UE determines a first parameter according to other parameters of the first DCI.

The first DCI format includes DCI format 0_0 and/or DCI format 0_1, and the first parameter includes at least one of: the number of bits of the first DCI, the type of the first DCI, the first information field in the first DCI, and the number of bits of a second information field in DCI and/or the bit position of the second information field in the DCI.

Other parameters of the first DCI include the second parameter of the first DCI and the third information field in the first DCI, a value of the second parameter in the first PUSCH configuration is the same as a value of the second parameter in the second PUSCH configuration, and the third information field is used for indicating that the first parameter is determined according to the first PUSCH configuration or the first parameter is determined according to the second PUSCH configuration. The second parameter of the first DCI may be, for example, the number of bits of the first DCI, and the number of bits of the third information field may be, for example, 1. The UE detects the first DCI according to the second parameter, and the UE determines the first parameter according to the first PUSCH configuration or determines the first parameter according to the second PUSCH configuration according to the third information field.

For example, PUSCH is configured with interlace in the first PUSCH configuration, PUSCH is configured with non-interlace (or contiguous) in the second PUSCH configuration, and the second parameter is the number of bits of the first DCI. Then, the number of bits of DCI format 0_0 in the first PUSCH configuration is the same as the number of bits of DCI format 0_0 in the second PUSCH configuration, and the number of bits of DCI format 0_1 in the first PUSCH configuration is the same as the number of bits of DCI format 0_1 in the second PUSCH configuration. The UE determines whether to determine the first parameter according to the first PUSCH configuration or according to the second PUSCH configuration through the third information field in the DCI format 0_0 and the DCI format 0_1. The number of bits of the third information field may be, for example, 1. In other words, one bit in DCI format 0_0 and DCI format 0_1 is used for indicating that the first parameter is determined according to the first PUSCH configuration or according to the second PUSCH configuration.

In step 402, the UE interprets the first DCI according to the first parameter.

For example, if the UE determines the bit position in DCI and/or the number of bits corresponding to the frequency domain resource allocation information field in DCI format 0_0 and DCI format 0_1, the UE can interpret the information in the frequency domain resource allocation information field in DCI format 0_0 and DCI format 0_1, thereby obtaining frequency domain resource allocation for data transmission.

Figure 5:
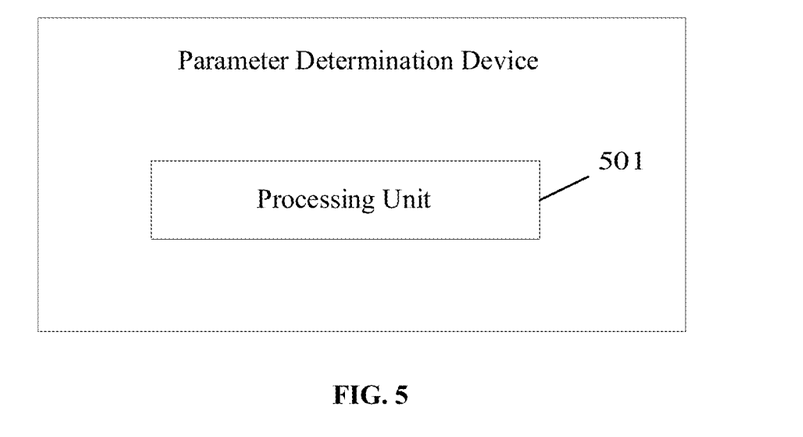
FIG. 5 is a schematic structural diagram of a parameter determination device according to some embodiments of the application.

Referring to FIG. 5. FIG. 5 is a parameter determination device according to some embodiments of the application, which is applied to UE, and the device includes following unit.

The processing unit 501 is configured to determine the first parameter of the first DCI according to the first information. The first information includes at least one of a cell-specific first PUSCH configuration, a UE-specific second PUSCH configuration, and a parameter of the first DCI other than the first parameter.

It can be seen that in the embodiments of the application, the UE determines the first parameter of the first DCI according to the first information, and the first information includes at least one of a cell-specific first PUSCH configuration, a UE-specific second PUSCH configuration, and a parameter of the first DCI other than the first parameter. The UE can determine the parameters of the first DCI, so as to interpret the first DCI.

In some exemplary embodiments, the format of the first DCI includes DCI format 0_0 and/or DCI format 0_1.

In some exemplary embodiments, the first parameter includes at least one of: a number of bits of the first DCI, a type of the first DCI, a first information field in the first DCI, a number of bits of a second information field in the first DCI, or a bit position of the second information field in the first DCI.

In some exemplary embodiments, the UE obtains the first PUSCH configuration, and the processing unit 501 is specifically configured to determine the first parameter according to the first PUSCH configuration in response to that the second PUSCH configuration is not acquired or that the second PUSCH configuration is acquired.

In some exemplary embodiments, the UE obtains the first PUSCH configuration, and the processing unit 501 is specifically configured to: determine the first parameter according to the first PUSCH configuration in response to that the second PUSCH configuration is not acquired; and determine the first parameter according to the second PUSCH configuration in response to that the second PUSCH configuration is acquired.

In some exemplary embodiments, during the resetting of the second PUSCH configuration, the processing unit 501 is specifically configured to determine the first parameter according to the first PUSCH configuration.

In some exemplary embodiments, the UE obtains the first PUSCH configuration, and the processing unit 501 is specifically configured to: determine the first parameter according to the first PUSCH configuration in response to that the second PUSCH configuration is not acquired; and determine the first parameter according to second information in response to that the second PUSCH configuration is acquired and first configuration parameters are different between the first PUSCH configuration and the second PUSCH configuration, wherein the second information includes a search space type in which the UE searches for DCI and/or a format of the first DCI.

In some exemplary embodiments, the search space types include a common search space (CSS) or a UE-specific search space (USS).

In some exemplary embodiments, the first configuration parameter includes a parameter for configuring PUSCH with interlace or non-interlace.

In some exemplary embodiments, the second information includes the search space type, and the processing unit 501 is specifically configured to: determine the first parameter according to the first PUSCH configuration in response to the search space type being CSS; and determine the first parameter according to the second PUSCH configuration in response to the search space type being USS.

In some exemplary embodiments, the second information includes the format of the first DCI, and the processing unit 501 is specifically configured to: determine the first parameter according to the first PUSCH configuration in response to the format being DCI format 0_0; and determine the first parameter according to the second PUSCH configuration in response to the format being DCI format 0_1.

In some exemplary embodiments, the second information includes the search space type and the format of the first DCI, and the processing unit 501 is specifically configured to: determine the first parameter according to the first PUSCH configuration in response to the search space type being CSS and the format being DCI format 0_0; and determine the first parameter according to the second PUSCH configuration in response to the search space type being CSS and the format being DCI format 0_1, or in response to the search space type being USS and the format being DCI format 0_0 or DCI format 0_1.

In some exemplary embodiments, the second information includes the search space type and the format of the first DCI, and the processing unit 501 is specifically configured to: determine the first parameter according to the first PUSCH configuration in response to the search space type being CSS and the format being DCI format 0_1; and determine the first parameter according to the second PUSCH configuration in response to the search space type being CSS and the format being DCI format 0_0, or in response to the search space type being USS and the format being DCI format 0_0 or DCI format 0_1.

In some exemplary embodiments, the second information includes the search space type and the format of the first DCI, and the processing unit 501 is specifically configured to: determine the first parameter according to the second PUSCH configuration in response to the search space type being USS and the format being DCI format 0_0; and determine the first parameter according to the first PUSCH configuration in response to the search space type being USS and the format being DCI format 0_1, or in response to the search space type being CSS and the format being DCI format 0_0 or DCI format 0_1.

In some exemplary embodiments, the second information includes the search space type and the format of the first DCI, and the processing unit 501 is specifically configured to: determine the first parameter according to the second PUSCH configuration in response to the search space type being USS and the format being DCI format 0_1; and determine the first parameter according to the first PUSCH configuration in response to the search space type being USS and the format being DCI format 0_0, or in response to the search space type being CSS and the format being DCI format 0_0 or DCI format 0_1.

In some exemplary embodiments, the other parameters of the first DCI include the second parameter of the first DCI and the third information field in the first DCI; a value of the second parameter in the first PUSCH configuration is same as a value of the second parameter in the second PUSCH configuration, and the third information field is used for indicating whether to determine the first parameter according to the first PUSCH configuration or according to the second PUSCH configuration.

It should be noted that the processing unit 501 may be implemented by a processor.

It should be noted that the specific implementation process of this embodiments may refer to the specific implementation process described in the foregoing method embodiments, which will not be described here.

Figure 6:
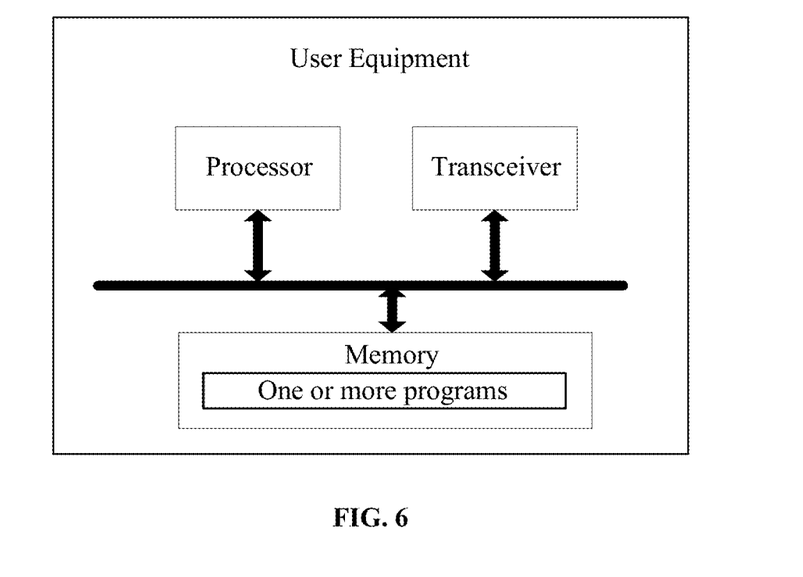
FIG. 6 is a schematic structural diagram of a user equipment according to some embodiments of the application.

Referring to FIG. 6. FIG. 6 illustrates a UE according to some embodiments of the application, which includes: one or more memories, one or more processors, one or more transceivers, and one or more programs. The one or more programs are stored in the memory and are configured to be executed by the one or more processors, and the programs include instructions for executing the following steps.

The first parameter of the DCI is determined according to the first information. The first information includes at least one of a cell-specific first PUSCH configuration, a UE-specific second PUSCH configuration, and a parameter of the first DCI other than the first parameter.

It can be seen that in the embodiments of the application, the UE determines the first parameter of the first DCI according to the first information, and the first information includes at least one of a cell-specific first PUSCH configuration, a UE-specific second PUSCH configuration, and a parameter of the first DCI other than the first parameter. The UE can determine the parameters of the first DCI, so as to interpret the first DCI.

In some exemplary embodiments, the format of the first DCI includes DCI format 0_0 and/or DCI format 0_1.

In some exemplary embodiments, the first parameter includes at least one of: a number of bits of the first DCI, a type of the first DCI, a first information field in the first DCI, a number of bits of a second information field in the first DCI, or a bit position of the second information field in the first DCI.

In some exemplary embodiments, the UE obtains the first PUSCH configuration, and in terms of determining the first parameter of the first DCI according to the first information, the program includes instructions specifically configured to perform the following steps: determining the first parameter according to the first PUSCH configuration in response to that the second PUSCH configuration is not acquired or that the second PUSCH configuration is acquired.

In some exemplary embodiments, the UE obtains the first PUSCH configuration, and in terms of determining the first parameter of the first DCI according to the first information, the program includes instructions specifically configured to perform the following steps: determining the first parameter according to the first PUSCH configuration in response to that the second PUSCH configuration is not acquired; and determining the first parameter according to the second PUSCH configuration in response to that the second PUSCH configuration is acquired.

In some exemplary embodiments, during the resetting of the second PUSCH configuration, in terms of determining the first parameter of the first DCI according to the first information, the program includes instruction specifically configured to perform the following steps: determining the first parameter according to the first PUSCH configuration.

In some exemplary embodiments, the UE obtains the first PUSCH configuration, and in terms of determining the first parameter of the first DCI according to the first information, the program includes instructions specifically configured to perform the following steps: determining the first parameter according to the first PUSCH configuration in response to that the second PUSCH configuration is not acquired; and determining the first parameter according to second information in response to that the second PUSCH configuration is acquired and first configuration parameters are different between the first PUSCH configuration and the second PUSCH configuration, wherein the second information comprises a search space type in which the UE searches for DCI and/or a format of the first DCI.

In some exemplary embodiments, the search space types include a common search space (CSS) or a UE-specific search space (USS).

In some exemplary embodiments, the first configuration parameter includes a parameter for configuring PUSCH with interlace or non-interlace.

In some exemplary embodiments, the second information includes the search space type, and in terms of determining the first parameter according to the second information, the program includes instructions specifically for performing the following steps: determining the first parameter according to the first PUSCH configuration in response to the search space type being CSS; and determining the first parameter according to the second PUSCH configuration in response to the search space type being USS.

In some exemplary embodiments, the second information includes the format of the first DCI, and in terms of determining the first parameter according to the second information, the program includes instructions specifically for performing the following steps: determining the first parameter according to the first PUSCH configuration in response to the format being DCI format 0_0; and determining the first parameter according to the second PUSCH configuration in response to the format being DCI format 0_1.

In some exemplary embodiments, the second information includes the search space type and the format of the first DCI. In terms of determining the first parameter according to the second information, the program includes instructions for executing the following steps: determining the first parameter according to the first PUSCH configuration in response to the search space type being CSS and the format being DCI format 0_0; and determining the first parameter according to the second PUSCH configuration in response to the search space type being CSS and the format being DCI format 0_1, or in response to the search space type being USS and the format being DCI format 0_0 or DCI format 0_1.

In some exemplary embodiments, the second information includes the search space type and the format of the first DCI. In terms of determining the first parameter according to the second information, the program includes instructions for executing the following steps: determining the first parameter according to the first PUSCH configuration in response to the search space type being CSS and the format being DCI format 0_1; and determining the first parameter according to the second PUSCH configuration in response to the search space type being CSS and the format being DCI format 0_0, or in response to the search space type being USS and the format being DCI format 0_0 or DCI format 0_1.

In some exemplary embodiments, the second information includes the search space type and the format of the first DCI. In terms of determining the first parameter according to the second information, the program includes instructions for executing the following steps: determining the first parameter according to the second PUSCH configuration in response to the search space type being USS and the format being DCI format 0_0; and determining the first parameter according to the first PUSCH configuration in response to the search space type being USS and the format being DCI format 0_1, or in response to the search space type being CSS and the format being DCI format 0_0 or DCI format 0_1.

In some exemplary embodiments, the second information includes the search space type and the format of the first DCI. In terms of determining the first parameter according to the second information, the program includes instructions for executing the following steps: determining the first parameter according to the second PUSCH configuration in response to the search space type being USS and the format being DCI format 0_1; and determining the first parameter according to the first PUSCH configuration in response to the search space type being USS and the format being DCI format 0_0, or in response to the search space type being CSS and the format being DCI format 0_0 or DCI format 0_1.

In some exemplary embodiments, the other parameters of the first DCI include the second parameter of the first DCI and the third information field in the first DCI; a value of the second parameter in the first PUSCH configuration is same as a value of the second parameter in the second PUSCH configuration, and the third information field is used for indicating whether to determine the first parameter according to the first PUSCH configuration or according to the second PUSCH configuration.

It should be noted that the specific implementation process of the embodiments may refer to the specific implementation process described in the foregoing method embodiments, which will not be described here.

Some embodiments of the application also provides a computer-readable storage medium, wherein the computer-readable storage medium stores a computer program for electronic data exchange, and the computer program causes a computer to execute part or all of the steps in any method as described in the above method embodiments, the above-mentioned computer includes user equipment.

Some embodiments of the application also provide a computer program product. The above-mentioned computer program product includes a non-transitory computer-readable storage medium storing a computer program. The above-mentioned computer program is operable to cause a computer to execute part or all of the steps in any of the methods described in the above method embodiments. The computer program product may be a software installation package, and the above-mentioned computer includes user equipment.

It should be noted that for the foregoing method embodiments, for the sake of simple description, they are all expressed as a series of action combinations, but those skilled in the art should know that this application is not limited by the described sequence of actions. Because according to this application, some steps can be performed in other order or at the same time. Secondly, those skilled in the art should also know that the embodiments described in the specification are all exemplary embodiments, and the actions and modules involved are not necessarily required by this application.

In the above-mentioned embodiments, the description of each embodiment has its own focus. For parts that are not described in detail in some embodiments, reference may be made to related descriptions of other embodiments.

In the several embodiments provided in this application, it should be understood that the disclosed device may be implemented in other ways.

For example, the device embodiments described above are only illustrative, for example, the division of the above-mentioned units is only a logical function division, and there may be other divisions in actual implementation.

For example, multiple units or components can be combined or integrated to another system, or some features can be ignored, or not implemented.

In addition, the displayed or discussed mutual coupling or direct coupling or communication connection may be indirect coupling or communication connection through some interfaces, devices or units, and may be in electrical or other forms.

The units described above as separate components may be or may not be physically separated, and the components displayed as units may be or may not be physical units. In other words, they may be located in one place, or they may be distributed on multiple network units. Some or all of the units may be selected according to actual needs to achieve the objectives of the solutions of the embodiments.

In addition, the functional units in the various embodiments of the application may be integrated into one processing unit, or each unit may exist alone physically, or two or more units may be integrated into one unit. The above-mentioned integrated unit can be implemented in the form of hardware or software functional unit.

If the above integrated unit is implemented in the form of a software functional unit and sold or used as an independent product, it can be stored in a computer readable medium. Based on this understanding, the technical solution of the application essentially or the part that contributes to the existing technology or all or part of the technical solution can be embodied in the form of a software product, and the computer software product is stored in a memory. A number of instructions are included to enable a computer device (which may be a personal computer, a server, or a network device, etc.) to execute all or part of the steps of the foregoing methods according to the various embodiments of the application. The foregoing memory includes: U disk, read-only memory (ROM), random access memory (RAM), mobile hard disk, magnetic disk or optical disk and other media that can store program codes.

Those of ordinary skill in the art can understand that all or part of the steps in the various methods according to the above-mentioned embodiments can be completed by instructing relevant hardware through a program. The program can be stored in a computer-readable memory, and the memory can include: flash disk, read-only memory (ROM), random access memory (RAM), magnetic disk or optical disk, etc.

The embodiments of the application are described in detail above, and specific examples are used in this article to illustrate the principles and implementation of the application.

The descriptions of the above embodiments are only used to help understand the methods and core ideas of the application. Also, for those of ordinary skill in the art, based on the concepts of the application, changes may be made in the specific implementation within the scope of application. In summary, the content of this specification should not be construed as limiting the application.

What is claimed is:

1. A parameter determination method, comprising:
   acquiring, by a user equipment (UE), a cell-specific first physical uplink shared channel (PUSCH) configuration; and
   determining, by the UE, a first parameter of a first downlink control information (DCI) according to the cell-specific first PUSCH configuration in response to that a UE-specific second PUSCH configuration is acquired.

2. The method according to claim 1, wherein a format of the first DCI comprises DCI format 0_0 and/or DCI format 0_1.

3. The method according to claim 1, further comprising:
   determining the first parameter according to the first PUSCH configuration in response to that the second PUSCH configuration is not acquired.

4. The method according to claim 1, wherein, during resetting of the second PUSCH configuration, the determining the first parameter of the first DCI according to the first information comprises: determining the first parameter according to the first PUSCH configuration.

5. The method according to claim 1, further comprising:
   determining the first parameter according to the first PUSCH configuration in response to that the second PUSCH configuration is not acquired; and
   determining the first parameter according to second information in response to that the second PUSCH configuration is acquired and first configuration parameters are different between the first PUSCH configuration and the second PUSCH configuration, wherein the second information comprises a search space type in which the UE searches for DCI and/or a format of the first DCI.

6. The method according to claim 5, wherein the search space type comprises a common search space (CSS) or a UE-specific search space (USS).

7. The method according to claim 5, wherein the first configuration parameter comprises a parameter for configuring PUSCH with interlace or non-interlace.

8. A user equipment (UE), comprising a memory, a processor, a communication interface, and one or more programs, wherein the one or more programs are stored in the memory and configured to be executed by the processor, and comprise instructions for performing:
   acquire a cell-specific first physical uplink shared channel (PUSCH) configuration;
   determining a first parameter of a first downlink control information (DCI) according to the cell-specific first PUSCH configuration in response to that a UE-specific second PUSCH configuration is acquired.

9. The user equipment according to claim 8, wherein a format of the first DCI comprises DCI format 0_0 and/or DCI format 0_1.

10. The user equipment according to claim 8, wherein the one or more programs further comprise instructions for performing:
determining the first parameter according to the first PUSCH configuration in response to that the second PUSCH configuration is not acquired.

11. The user equipment according to claim 8, wherein, during resetting of the second PUSCH configuration, the determining the first parameter of the first DCI according to the first information comprises: determining the first parameter according to the first PUSCH configuration.

12. The user equipment according to claim 8, wherein the one or more programs further comprise instructions for performing:
determining the first parameter according to the first PUSCH configuration in response to that the second PUSCH configuration is not acquired; and
determining the first parameter according to second information in response to that the second PUSCH configuration is acquired and first configuration parameters are different between the first PUSCH configuration and the second PUSCH configuration, wherein the second information comprises a search space type in which the UE searches for DCI and/or a format of the first DCI.

13. The user equipment according to claim 12, wherein the search space type comprises a common search space (CSS) or a UE-specific search space (USS).

14. The user equipment according to claim 12, wherein the first configuration parameter comprises a parameter for configuring PUSCH with interlace or non-interlace.

15. A non-transitory computer-readable storage medium, storing a computer program for electronic data exchange, wherein the computer program causes a computer to perform:
acquiring a cell-specific first physical uplink shared channel (PUSCH) configuration; and
determining a first parameter of a first downlink control information (DCI) according to the cell-specific first PUSCH configuration in response to that a UE-specific second PUSCH configuration is acquired.

16. The method according to claim 1, wherein the first parameter comprises at least one of: a number of bits of the first DCI, a type of the first DCI, a first information field in the first DCI, a number of bits of a second information field in the first DCI, or a bit position of the second information field in the first DCI.

17. The user equipment according to claim 8, wherein the first parameter comprises at least one of: a number of bits of the first DCI, a type of the first DCI, a first information field in the first DCI, a number of bits of a second information field in the first DCI, or a bit position of the second information field in the first DCI.

18. The medium according to claim 15, wherein the first parameter comprises at least one of: a number of bits of the first DCI, a type of the first DCI, a first information field in the first DCI, a number of bits of a second information field in the first DCI, or a bit position of the second information field in the first DCI.

* * * * *